(12) United States Patent
Hohenacker

(10) Patent No.: US 10,192,440 B2
(45) Date of Patent: Jan. 29, 2019

(54) SYSTEM FOR DISPLAYING PARKING SPACES

(71) Applicant: CLEVERCITI SYSTEMS GMBH, Starnberg (DE)

(72) Inventor: Thomas Hohenacker, Starnberg (DE)

(73) Assignee: CLEVERCITI SYSTEMS GMBH, Starnberg (DE)

( * ) Notice: Subject to any disclaimer, the term of this patent is extended or adjusted under 35 U.S.C. 154(b) by 0 days.

(21) Appl. No.: 15/525,769

(22) PCT Filed: Nov. 9, 2015

(86) PCT No.: PCT/EP2015/076085
§ 371 (c)(1),
(2) Date: May 10, 2017

(87) PCT Pub. No.: WO2016/075086
PCT Pub. Date: May 19, 2016

(65) Prior Publication Data
US 2018/0174453 A1 Jun. 21, 2018

(30) Foreign Application Priority Data

Nov. 11, 2014 (DE) .......................... 10 2014 116 455
Oct. 30, 2015 (DE) .......................... 10 2015 118 598

(51) Int. Cl.
*G08G 1/14* (2006.01)
*G07B 15/02* (2011.01)

(52) U.S. Cl.
CPC ............. *G08G 1/147* (2013.01); *G07B 15/02* (2013.01); *G08G 1/142* (2013.01); *G08G 1/144* (2013.01); *G08G 1/146* (2013.01)

(58) Field of Classification Search
CPC ... B60Q 1/48; B60R 1/00; B62D 1/00; G06K 9/00771; G08G 1/04; G08G 1/08;
(Continued)

(56) References Cited

U.S. PATENT DOCUMENTS 5,434,927 A * 7/1995 Brady .................... G08G 1/015
348/148
5,847,755 A * 12/1998 Wixson .............. G06K 9/00785
348/149

(Continued)

FOREIGN PATENT DOCUMENTS

DE 102012022038 A1 5/2013
EP 2138653 A2 12/2009

*Primary Examiner* — Quan-Zhen Wang
*Assistant Examiner* — Stephen R Burgdorf

(57) ABSTRACT

The invention relates to a system which comprises at least one street-lighting device, a camera system mounted thereon, a recognition unit, a transmission unit and a mobile display device. The camera system is designed to provide image indicators of parking spaces within a parking lot. The recognition unit is designed: to store the geographical coordinates of parking spaces present in the visual range of the camera system; to assign, depending on the image indicators, to each parking space a respective occupation status, said status specifying whether the respective parking space is available or occupied; and to provide the transmission unit with the respective occupation status of at least the available parking spaces and the associated geographical coordinates, the transmission unit being designed to transmit the respective occupation status at least of the available parking spaces and the associated geographical coordinates to the mobile display device.

20 Claims, 1 Drawing Sheet

(58) Field of Classification Search
CPC .......... G08G 1/14; G08G 1/141; G08G 1/142;
G08G 1/143; G08G 1/144; G08G 1/146;
G08G 1/147; G08G 1/148; G08G 1/149
USPC ...................................................... 340/932.2
See application file for complete search history.

(56) References Cited

U.S. PATENT DOCUMENTS

| | | | |
|---|---|---|---|
| 6,285,297 B1 | 9/2001 | Ball | |
| 6,340,935 B1 * | 1/2002 | Hall | G07B 15/04 340/905 |
| 6,437,819 B1 * | 8/2002 | Loveland | H04N 7/181 348/143 |
| 6,466,260 B1 * | 10/2002 | Hatae | G08G 1/0175 348/149 |
| 7,893,848 B2 * | 2/2011 | Chew | G08G 1/14 340/932.2 |
| 8,704,680 B1 | 4/2014 | Zhang | |
| 9,773,413 B1 * | 9/2017 | Li | G05D 1/021 |
| 2005/0206778 A1 * | 9/2005 | Chang | H04N 5/2252 348/373 |
| 2006/0074546 A1 * | 4/2006 | DeKock | G08G 1/01 701/117 |
| 2007/0263090 A1 * | 11/2007 | Abe | B60R 1/00 348/148 |
| 2009/0251250 A1 * | 10/2009 | Tait | H01F 7/0252 335/285 |
| 2009/0284625 A1 * | 11/2009 | Takemura | H04N 5/57 348/254 |
| 2009/0303703 A1 * | 12/2009 | Kao | F21S 8/086 362/183 |
| 2010/0277603 A1 * | 11/2010 | Tsai | H04N 5/23248 348/208.4 |
| 2013/0113936 A1 * | 5/2013 | Cohen | G07B 15/02 348/148 |
| 2013/0121538 A1 * | 5/2013 | Daniels | G06K 9/00 382/107 |
| 2013/0193921 A1 * | 8/2013 | George | B60L 11/1824 320/109 |
| 2013/0265419 A1 | 10/2013 | Bulan et al. | |
| 2013/0268433 A1 * | 10/2013 | Viner | G06Q 20/145 705/40 |
| 2013/0339024 A1 * | 12/2013 | Kojima | G08G 1/123 704/270.1 |
| 2014/0307087 A1 * | 10/2014 | Evanitsky | G08G 1/164 348/143 |
| 2015/0172518 A1 * | 6/2015 | Lucas | H04N 5/2251 348/148 |
| 2016/0050397 A1 * | 2/2016 | Di Giamberardino | H05B 37/0227 315/149 |
| 2016/0108590 A1 * | 4/2016 | Wydotis | B61L 5/1872 362/430 |
| 2016/0125246 A1 * | 5/2016 | Ryhorchuk | H04N 19/30 348/143 |
| 2016/0173749 A1 * | 6/2016 | Dallas | H04N 5/2352 348/208.6 |
| 2016/0269647 A1 * | 9/2016 | Kim | G08B 13/19617 |
| 2016/0380578 A1 * | 12/2016 | Jensen | F24J 2/526 211/41.1 |

* cited by examiner

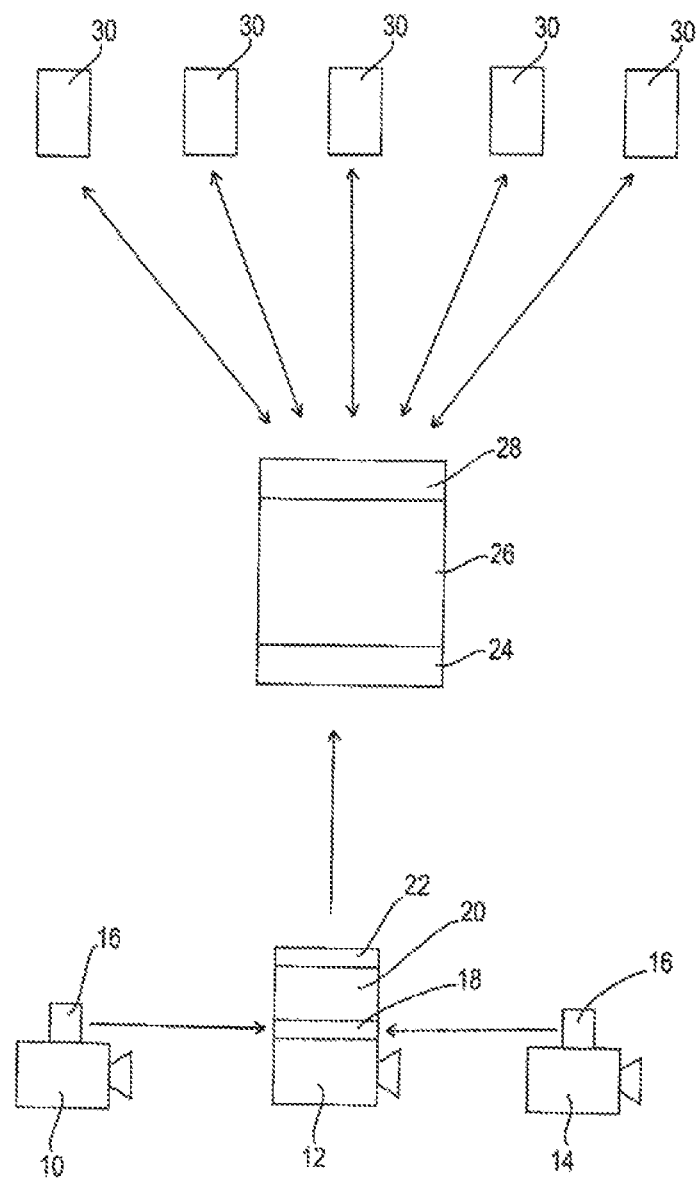

SYSTEM FOR DISPLAYING PARKING SPACES

CROSS REFERENCE TO RELATED APPLICATIONS

This application is a national stage application under 35 U.S.C. 371 of PCT Application No. PCT/EP2015/076085 having an international filing date of 9 Nov. 2015, which PCT application claimed the benefit of German Patent Application No. 10 2014 116455.5 filed 11 Nov. 2014 and of German Patent Application No. 10 2015 118598.9 filed 30 Oct. 2015, the entire disclosure of each of which are hereby incorporated herein by reference.

A high proportion of the traffic in city centers is caused by vehicles whose drivers are only looking for somewhere to park. In addition to an undesirably high time effort and equally undesirably high gasoline costs, this also results in disadvantageous environmental pollution due to the mentioned searching traffic. The shortage of parking spaces in city centers thus has a negative effect both on the drivers of motor vehicles searching for a parking space and with respect to the environmental impact.

It is an object of the invention to provide a system for displaying parking space areas which allows an improved and, in the ideal case, an optimum utilization of the parking space areas available in city center areas, for example. It should in particular become possible in accordance with the invention to guide the drivers of motor vehicles looking for a parking space to free parking space areas by the shortest or fastest route.

This object is satisfied by a method in accordance with claim 1 and in particular by a system composed of at least one street-lighting device, a camera system mounted at the street-lighting device, a recognition unit, a transmission unit and a mobile display unit, wherein the camera system is configured for delivering image indications from within parking space areas located within a parking space zone, and wherein the recognition unit is configured to store the geographical coordinates of parking space areas located in the field of view of the camera system;
associate a respective occupation status in dependence on the image indications with the parking space areas, said occupation status marking whether a respective parking space area is free or occupied; and
to provide the respective occupation status of at least the free parking space areas with the associated geographical coordinates to a transmission unit, wherein the transmission unit is configured to transmit the respective occupation status of at least the free parking space areas with the associated geographical coordinates to the mobile display unit.

In accordance with the invention, free parking space areas within each parking space zone monitored by a camera system are therefore dynamically determined and displayed. To implement the system in accordance with the invention, at least one camera system, at least one recognition unit, at least one transmission unit, and at least one display device act together. The camera system is in this respect installed at a street-lighting device, whereby it is achieved in an advantageous manner that no permission from private building owners has to be obtained for the installation. In addition, where required, the energy source of the street-lighting device can enable the energy supply of the camera system and of components connected thereto; alternatively, however, storage battery operation or battery operation is also possible.

The camera system is installed and oriented such that it can preferably detect a respective plurality of parking space areas of a parking space zone. The image indications of the parking space areas delivered to the recognition unit can, for example, be image recordings of the complete parking space areas or also only images of part areas of the parking space areas. The image indications only have to represent a parking space area in such a manner that the recognition unit can associate an occupation status with the parking space areas using the image indications, said occupation status marking whether a respective parking space area is free or occupied. The occupation status of a parking space area determined by the recognition unit is then associated with its respective geographical coordinates that are stored in the recognition unit. These geographical coordinates are thereupon communicated together with the associated occupation status to the transmission unit that then transmits these data to the display device that visually or acoustically illustrates the geographical locations at which free parking space areas are located.

An internet-enabled mobile or stationary end device can preferably be used as the display unit. It is particularly preferred for the display unit to be configured as an internet-enabled cell phone or as an internet-enabled vehicle computer. A stationary computer or a display panel can, however, also equally be used.

The transmission unit can deliver the named data to a plurality of display units of different users to whom the location at which they can find free parking space areas can respectively be illustrated.

A plurality of, for example, public parking space areas can consequently be detected together with their respective occupation status by means of the system in accordance with the invention, wherein it is possible on the basis of the detected data to communicate to a large number of users where free parking space areas are located at a current point in time that can then be driven to directly and by the shortest route.

The recognition unit being used in accordance with the invention can be completely located in the housing of the camera system; however, only parts of the recognition unit can also be accommodated in the housing of the camera system. In the last-named case, the remaining parts of the recognition unit are as a rule located in the region of the transmission unit, in particular within a server that also includes the transmission unit. The transmission unit can, for example, be accommodated in a server space spatially spaced apart from the street-lighting device, wherein the server preferably has the occupation status information or image indications or data from a plurality of camera systems and/or recognition units provided wirelessly.

It is particularly preferred if a large amount of the evaluation of the image indications takes place within the recognition unit accommodated in the housing of the camera system since then only the data resulting from the evaluation have to be transmitted to the transmitter unit or to the server. The volume of these data is considerably lower than the data or image indications delivered by the camera system so that only a small bandwidth is required for the transmission of these data from the recognition unit to the server or to the transmitter unit. In addition, only evaluation data are then stored or processed on the server that are non-critical under aspects of data protection since such evaluation data, unlike the image indications, does not include any vehicle license plates, for example.

If, for example, camera systems are installed at different street-lighting devices along a long road, it is not necessary for a separate recognition unit that respectively communicates with the transmitter unit or with a server to be associated with each camera system. It is rather sensible in this case that only one or a few of the recognition units takes/take over the named communication, whereas the other recognition units transmit their data using a narrowband transmission system to the one recognition unit or to the few recognition units that then communicates/communicate with the transmitter unit or the server.

Alternatively, the evaluation of the image indications exclusively takes place within a housing of the camera system and in particular exclusively in the recognition unit. This means that no further data have to leave the housing of the camera system except for the occupation status that e.g. indicates the coordinates of free and occupied parking space areas. For this purpose, the camera system and the recognition unit can be arranged in a common housing, wherein in particular the housing of the camera system forms the common housing. The images or the image indications recorded by the camera system can thus be processed within the housing and subsequently discarded. Strict data protection regulations that relate to public space can also be satisfied in this manner since no image data, personal information or the like are stored or output.

The image indications preferably exclusively comprise individual images, i.e. still images. This means the evaluation in the recognition unit can only be based on individual images. In this respect, the respective occupation status can be determined solely by an individual image. Alternatively or additionally, differences between two individual images of the same section of the parking space zone (i.e. differences between two image indications) can also be used for determining the occupation status.

Respective individual images of different areas of the parking space zone can in particular be detected after one another. On the use of a pivotable camera system, the camera system can be pivoted after the recording of an individual image and can detect a different area of the parking space zone. If a plurality of cameras are used, the cameras can each record an individual image after one another and transmit them to the recognition unit.

The recognition unit is further preferably configured to determine an occupation status independently of predefined parking space areas defined by lines on the ground, for example. This means that parking space areas can also be recognized as free on a parking space zone when the parking space areas are not marked as such by lines, rectangles or the like. The recognition of free parking space areas can thus be carried out in the total field of view of the camera system, independently of whether the parking space areas are marked as such or not.

The recognition unit can furthermore be configured to determine the size of a respective parking space area recognized as free and output it together with the occupation status. A free parking space area can be assigned to a vehicle having suitable dimensions with reference to the size, whereby the number of vehicles that can be parked on a parking space zone can be increased.

In accordance with an advantageous embodiment, the camera system is adapted to set an exposure time in a substantially unlimited time range in dependence on the brightness in the field of view of the camera system. It is made possible due to the exposure time adjustable over a wide time range also to generate image indications that can be evaluated in the dark without having to need additional lighting (e.g. infrared lighting). The exposure time can preferably be set with reference to the brightness in a part region of the field of view. Two square part regions can, for example, be predefined in the field of view within which the brightness is determined.

The possibility of using substantially any desired exposure times results from the recording of individual images for which the respective exposure time can be freely selected. An advantage hereby results with respect to video-based systems in which the maximum exposure time depends on the picture rate and cannot be set at any desired amount.

The number of recorded image indications per unit of time can reduce due to the longer exposure time in the dark. However, the occupation state of parking space areas does not change at very short time intervals so that very long exposure times of a plurality of seconds are also sufficient for a sufficiently exact monitoring of the parking space areas. A maximum exposure time of two seconds can preferably be predefined.

The recognition unit can be configured to compensate movements of the camera system that are caused by movements of the street lighting device relative to the parking space zone in the image indications delivered by the camera system by means of an image processing method such that the image indications are not falsified by the movements of the camera system. Movements of the street-lighting device that are caused by wind, for example, can thus be compensated by an electronic image stabilization. For this purpose, reference points such as traffic lights, markings on houses or street signs can be fixed, at the image center where possible, that have an unchangeable position relative to the detected parking space areas. A marking can preferably be applied to a carrier element ("lamp pole") of the street-lighting device, in particular in a region of the carrier element close to the ground. This has the advantage that the marking can also hardly change its position e.g. by a strong wind and can typically be easily recorded by the camera system. This image indications of the parking space areas can then be processed independently of their absolute positions within the image only in dependence on their position relative to the reference points or relative to the marking, whereby the named movements of the street-lighting devices can be eliminated in the processing.

In addition, an additional marking can also be applied to the carrier element that is arranged spaced apart from the marking. A twisting of the carrier element can be determined, for example, on the basis of a displacement of the relative positions of the marking and the additional marking. Position changes of the camera system can hereby be determined even more precisely.

Alternatively or additionally, the recognition unit and/or the camera system can have at least one acceleration sensor and/or a gyroscope for detecting movements of the street-lighting device and of the camera system installed thereat. A rotation of the camera system can equally be detected by means of such components as movements along three orthogonal axes. The image indications of the camera system can in turn be processed on the basis of the measured data delivered by the acceleration sensor or the gyroscope such that they are not falsified by movements of the street-lighting device.

There are thus ultimately two different methods of compensating movements of the street-lighting device, wherein these two methods can be used alternatively or in combination. As a rule, the compensation by means of an image processing method is used when good and useful reference points are available. If this is not the case, the acceleration sensor or the gyroscope can be used.

It is particularly advantageous if the camera system has an electrically controllable swivel and tilt head for moving at least one camera optics relative to the parking space zone and/or has a zoom lens. The total parking space zone associated with a camera system can be detected with a high resolution by the movement of the swivel and tilt head and/or by setting the zoom lens. A periodic, exact coverage of the complete parking space zone becomes possible in this manner, wherein a series of positions of the swivel and tilt head can be fixed using associated zoom settings as part of an initializing process. These positions are then each moved to by a fast movement of the swivel and tilt head and by a zoom setting taking place in parallel, whereupon an image is recorded such that the next position can be moved to afterward. Previously recorded images or image indications can already be processed by the recognition during the adjustment of the swivel and tilt head between two positions.

The fact is particularly advantageous that, on the use of a swivel and tilt head, the initialization and thus the respective required alignment of the camera system can be carried out electronically and remotely by trained technicians after its installation at the street-lighting device since no adjustment at all is necessary during the installation itself.

Alternatively or additionally to the use of a swivel and tilt head, the camera system attached to the street-lighting device can also have a plurality of cameras stationary relative to one another and oriented differently from one another. These individual cameras then seamlessly and completely cover the parking space zone associated with the respective camera system, in particular without a movement of these cameras being necessary for this purpose.

It can be achieved both by the use of a camera system having a plurality of cameras and by the use of a swivel and tilt head with an adjustable zoom lens that distortion through wide-angle lenses can largely be avoided. It is in any case sensible to select a maximum angle of view of the camera for recording the image indications such that no image distortion occurs; alternatively, however, it is also possible to carry out a processor-assisted rectification on the occurrence of distortion.

Even when a camera system having a plurality of differently oriented cameras is used, it is sensible to attach this camera system to the street-lighting device via a swivel and tilt mechanism since an initializing or an alignment of the camera system can then also in this case only be carried out after the installation by trained technicians.

In accordance with a preferred embodiment, the camera system comprises at least two fixed-position, differently oriented cameras whose fields of view at least regionally overlap. The marking and the additional marking or the reference point for compensating movements of the camera system can preferably be arranged in the overlapping field of view. The recognition unit advantageously respectively only evaluates the image indications of exactly one camera at one point in time or during a time interval. The respective other camera or the other cameras can be switched off at the point in time or during the time interval. It is of advantage in this respect that the energy consumption of the system can be reduced. In addition the possibility results of only providing exactly one processor (or microprocessor) in the recognition unit that is alternatingly coupled to one of the respective cameras. The material costs of the system can be reduced in this manner.

It is particularly advantageous if the camera system is fastened to a projection of the street-lighting device. As a rule, the illumination means of the street-lighting device are also arranged at such a projection such that it can be assumed with a high degree of probability that no objects such as trees are located between the projection and the zone to be illuminated or to be detected by the camera system. It is achieved by the fastening of the camera system to the projection to this extent that the field of view of the camera system is not restricted by disturbing objects with a high degree of probability.

This probability can be additionally increased when the camera system is arranged adjacent to a lighting module of the street-lighting device such that the spacing between the camera system and the carrier element, for example the lamp pole, is larger than the spacing between the lighting module and the carrier element. The camera system is then located as far as possible away from the carrier element and thus also at a maximum distance from trees that may be present in the region of the carrier element.

When the camera system is fastened to a projection of the street-lighting device, the former can be partly or completely integrated in the lighting unit associated with the street-lighting device with or without a recognition unit. Alternatively, but less preferably, an installation of the camera system and/or of the recognition unit is naturally also possible at the carrier element of the street-lighting device.

A particularly advantageous optical design of the system in accordance with the invention results when the camera system with or without the recognition unit has a housing whose shape is adapted to the shape of the street-lighting device. The camera system and, optionally, the recognition unit are in this case then no longer recognizable as separate units from the outside.

It is furthermore advantageous if the street-lighting device, on the one hand, has a profile groove with a constant cross-section and, on other hand, a lighting module and the camera system each have a profile prolongation complementary thereto for coupling with the profile groove. The profile prolongation can equally also conversely be present at the street-lighting device and the profile groove can be present at the lighting module and at the camera system. Such a system enables a particularly simple coupling between the lighting module/camera system and the street-lighting device, wherein a different number of lighting modules can be coupled, in particular as required, with the street-lighting device.

It is alternatively also possible to fasten at least one lighting module and/or the camera system respectively to the street-lighting device only by means of a magnetic coupling. A particularly fast and simple installation hereby becomes possible.

The street-lighting device can furthermore be a lamp-carrying cable system that is, for example, installed between a plurality of buildings. A cable anchorage can be an element of the street-lighting device, wherein the camera system can be attached to the cable anchorage.

The recognition unit can be configured to control or to switch on or off or to dim the brightness of lighting modules of the street-lighting device in dependence on parameters determined from the image indications, in particular in dependence on brightness values and/or detected movements. This variant in accordance with the invention that is of interest under aspects of saving energy is based on the recognition that a comparatively strong lighting of the parking space zone is only necessary when it is dark and at the same time a movement of pedestrians or automobiles is detected. In other cases, a dimmed lighting is sufficient that must, however, be sufficient to be able to recognize the parking space areas with sufficient resolution by means of the camera system. For example, in the event of snow on the parking space zone, the lighting can be dimmed, whereas with leaves on the parking space zone the lighting is increased. In addition, it becomes possible by the named variant to dim the lighting modules when the parking space zone is already illuminated by automobile headlamps.

It is particularly preferred if the recognition unit is configured to control the brightness of lighting modules pf the street-lighting devices associated with it and of further street-lighting devices in dependence on parameters determined from the image indications, in particular in dependence on brightness values and/or detected movements. In this case, street-lighting devices can then also be correspondingly switched on, switched off or dimmed that are present adjacent to the system in accordance with the invention and that have no system in accordance with the invention. In this manner, the installation of a system in accordance with the invention at every street-lighting device can be avoided; it is rather sufficient if the system in accordance with the invention is only present at some street-lighting devices that then likewise co-control the other street-lighting devices.

It is advantageous if a solar panel that serves for the energy supply of the camera system and, optionally, of the recognition unit is installed at the street-lighting device. In this case, a feed of the camera system and, optionally, of the recognition unit, by the grid voltage anyway available in the street-lighting device is superfluous.

It is particularly preferred if the street-lighting apparatus has an energy supply unit for electric automobiles. Such an energy supply unit or charging station can then communicate directly with the recognition unit in accordance with the invention by cable or wirelessly such that the recognition unit can send data of the charging station to a remotely arranged server in order thus ultimately to be able to take over the data communication of the charging station with the server.

It is of advantage if the recognition unit is configured to detect whether the energy supply unit or charging station is operated in the charge mode or in the standby mode to provide corresponding status information together with the geographical coordinates of the associated street-lighting device to a transmission unit in dependence on the detected operating mode. The transmission unit is then configured to transmit the respective operating mode of the energy supply unit with the geographical coordinates of the associated street-lighting device to the mobile display unit. It can thus be detected whether a charging station is actually charging or not. For the case that no charging is taking place, a check can simultaneously be made whether a vehicle is located at the charging station and thus makes a use by another vehicle impossible. It can be displayed to users on their mobile display devices on the basis of this information, that is, for example, communicated to a remotely arranged server, whether a specific charging station is free or not.

It furthermore becomes possible ultimately not to bill the power charged at the charging station, but rather only the time spent or the time parked at the charging station that is reported to a server by the recognition unit. This variant is of interest since the sale of power is frequently substantially less lucrative than the sale of parking time. For example, power at a value of approximately €2.50 can typically be charged for one hour, whereas the parking time can be billed at €5 to €10 an hour. In this manner, the complex billing of the individually charged power can be completely dispensed with.

The recognition unit in accordance with the invention can be configured to classify motor vehicles detected by the camera system using typical features and thus to distinguish electric models from models with an internal combustion engine. In this manner, a server or correspondingly deployed parking attendants can be informed when and where a vehicle with an internal combustion engine is illegally parked at a charging station, whereupon suitable measures can be taken.

The recognition unit can additionally be configured to output edge images or contour images of (motor) vehicles detected by the camera system. The edge images or contour images can be a black-and-white representation of a section of the camera image or of the image indications, wherein the edge images or contour images are in particular output when a maximum parking time has been exceeded by a vehicle. The edge images or contour images can show the vehicle at the start of the parking process and after the reaching of the maximum parking time, with the edge images or contour images e.g. being able to be communicated directly to parking attendants. The edge images or contour images can comprise time information and/or position information (GPS information).

An exceeding of the maximum parking time can e.g. be displayed to the parking attendants on the basis of the output edge images or contour images. It can additionally be determined by a comparison of the images at the start of the parking process with the images after the reaching of the maximum parking time whether the vehicle has moved during the parking process. If no movement can be found, this is legally acceptable proof of the exceeding of the maximum parking time. The maximum parking time for a respective parking space area can be stored in the recognition unit.

It is of advantage with such evidence that only the outlines of a vehicle can be recognized by the use of edge images or contour images, whereby the already mentioned strict data protection regulations for public space can also be observed. The edge images or contour images can be generated, for example by an edge filter algorithm such as the Sobel algorithm, from the image indications.

The recognition unit is preferably configured to apply a filter algorithm separately to each parking space area of the parking space zone in order thus to compensate brightness differences between the detected parking space areas. This allows a high-quality evaluation of the image indications delivered by the camera system when, for example, specific parking space areas are in the shade and other parking space areas are in sunlight.

The recognition unit can comprise one or more multicore processors that can be switched on or off depending on the required processing power. Up to four quad core processors or octa-core processors are preferably used. The larger the detected parking space zone, the higher the required processing power.

The evaluation to be carried out by the recognition unit is facilitated when different zones, including their geographical coordinates, are clearly defined as part of the initialization of the camera system. These zones then correspond to different parking space zone types, for example parking space zones, charging zones, no parking signs, disabled parking spaces, etc.

The basic principle in accordance with the invention will be explained in the following with reference to the only FIGURE which shows a schematic representation of components which can be used in accordance with the invention.

A total of three camera systems 10, 12, 14 installed at street-lighting devices, not shown, are provided in the region of a street, with the two camera systems 10, 14 each being equipped with a network transmitter 16. The units of camera systems 10, 14 and network transmitters 16 are suitable to transmit the images taken by the camera systems 10, 14 to a network receiver 18 which is coupled to the camera system 12.

A recognition unit 20 in accordance with the invention is further connected to the camera system 12 and the geographical coordinates of the parking place areas located in the field of view of the camera systems 10, 12, 14 are stored therein. The recognition unit 20 is configured to associate a respective occupation status, which marks whether a respective parking space area is free or occupied, with the named parking space areas in dependence on the images delivered by the camera systems 10, 12, 14.

The recognition unit 20 provides the respective occupation status with the associated geographical coordinates of a parking space area to a transmission unit 22 which is coupled with the recognition unit 20.

The transmission unit 22 transmits these data to a reception unit 24 of a central server 26.

Further combinations—not shown—of camera systems, network transmitters, network receivers, recognition units and transmission units are provided in further streets and likewise transmit corresponding data to the reception unit 24 of the central server 26.

The server 26 has a transmission/reception unit 28 via which it can transmit the occupation status of the parking space areas, including the associated geographical coordinates, detected by the camera systems 10, 12. 14 to a plurality of display units 30. These display units 30 are configured, for example, as internet-enabled mobile end devices on which it is possible to display to a respective user at which geographical position in his vicinity free parking space areas are just free.

The display units 30 are suitable for sending user queries to the transmission/reception unit 28 of the server 26 to be able, for example, to communicate to the server 26 for which geographical region parking space area data should be transmitted to the respective display unit 30.

Instead of the above-explained camera system, a radar system can also be used such that then, instead of the image indications of the camera system, the image indications of a radar system are processed by the recognition unit. A radar system can equally be used in addition to the camera system such that then the image indications of the camera system and the image indications of a radar system are processed by the recognition unit.

Within the framework of the invention, a camera system is therefore to be understood, on the one hand, as a pure camera system; on the other hand, as a pure radar system; and finally, however, also as a combination of camera and radar systems.

The invention is not restricted to the above-described embodiment; any desired combinations are rather conceivable here within the framework of the complete above description and the claims.

REFERENCE NUMERAL LIST

10, 12, 14 camera systems
16 network transmitter
18 network receiver
20 recognition unit
22 transmission unit
24 reception unit
26 server
28 transmission/reception unit
30 display unit

The invention claimed is:

1. A system comprising:
   at least a street-lighting device;
   a camera system mounted on the street-lighting device;
   a recognition unit;
   a transmission unit; and
   a mobile display unit;
   wherein the camera system is configured for delivering image indications of parking space areas disposed within a parking space zone; and
   wherein the recognition unit is configured to:
      store geographical coordinates of parking space areas located in a field of view of the camera system;
      associate a respective occupation status in dependence on the image indications of the parking space areas, the respective occupation status marking whether a respective parking space area is free or occupied; and
      provide the respective occupation status of at least the free parking space areas with the associated geographical coordinates to the transmission unit;
   wherein the transmission unit is configured to transmit the respective occupation status of at least the free parking space areas with the associated geographical coordinates to the mobile display unit; and
   wherein the recognition unit is configured to output edge images and/or contour images of a parked motor vehicle detected by the camera system, with the edge images and/or contour images being output when a maximum parking time of the parked motor vehicle has been exceeded, and with the edge images and/or contour images showing the parked motor vehicle at the start of a parking process and after the reaching of the maximum parking time.

2. The system in accordance with claim 1, wherein the recognition unit is configured to compensate movements of the camera system that are caused by movements of the street-lighting device relative to the parking space zone in the image indications delivered by the camera system by means of an image processing method such that the image indications are not falsified by the movements of the camera system.

3. The system in accordance with claim 1, wherein the image indications exclusively comprise individual images.

4. The system in accordance with claim 1, wherein the camera system is configured to detect respective image indications of different areas of the parking space zone after one another.

5. The system in accordance with claim 1, wherein the recognition unit is configured to determine an occupation status independently of predefined parking space areas.

6. The system in accordance with claim 1, wherein the camera system and the recognition unit are arranged in a common housing, with only data relating to the respective occupation status being output from the common housing.

7. The system in accordance with claim 1, wherein at least one of the recognition unit and the camera system has at least one acceleration sensor and/or a gyroscope for detecting movements of the camera system that are caused by movements of the street-lighting device relative to the parking space zone.

8. The system in accordance with claim 1,
   wherein the camera system is fastened to a projection of the street-lighting device and
   wherein the camera system is arranged adjacent to a lighting module of the street-lighting device.

9. The system in accordance with claim 1, wherein the camera system has at least two fixed-position, differently oriented cameras whose fields of view at least regionally overlap.

10. The system in accordance with claim 9, wherein a marking is applied to a carrier element of another street-lighting device in the field of view of the camera system and wherein the marking is arranged in the overlapping field of view.

11. The system in accordance with claim 9, wherein only one processor is provided in the recognition unit that is selectively couplable with a respective exactly one of the cameras.

12. The system in accordance with claim 1, wherein the street-lighting device has a profile groove with a constant cross-section and wherein a lighting module and the camera system each have a profile prolongation complementary thereto for coupling with the profile groove.

13. The system in accordance with claim 1, wherein at least one lighting module and/or the camera system is/are respectively exclusively held at the street-lighting device by means of a magnetic coupling.

14. The system in accordance with claim 1, wherein the recognition unit is configured to control a brightness of lighting modules of the street-lighting device in dependence on parameters determined from the image indications.

15. The system in accordance with claim 1, wherein the recognition unit is configured to control a brightness of lighting modules of the street-lighting device associated with it and of further street-lighting devices in dependence on parameters determined from the image indications.

16. The system in accordance with claim 1, wherein the street-lighting device has an energy supply unit for charging electric automobiles.

17. The system in accordance with claim 16, wherein the recognition unit is configured:
to detect whether the energy supply unit is operated in a charge mode or in a standby mode; and
to provide corresponding status information together with geographical coordinates of the street-lighting device to the transmission unit in dependence on the detected operating mode,
wherein the transmission unit is configured to transmit the respective operating mode of the energy supply unit with the geographical coordinates of the street-lighting device to the mobile display unit.

18. The system in accordance with claim 17, wherein the recognition unit is configured to classify vehicles detected by the camera system using features associated with electric vehicle models and combustion engine vehicle models and thus to distinguish electric vehicle models from combustion engine vehicle models.

19. The system in accordance with claim 1, wherein the recognition unit is configured to apply a filter algorithm separately to each parking space area of the parking space zone to compensate brightness differences between the parking space areas.

20. A system comprising:
at least a street-lighting device;
a camera system mounted on the street-lighting device;
a recognition unit;
a transmission unit; and
a mobile display unit;
wherein the camera system is configured for delivering image indications of parking space areas disposed within a parking space zone; and
wherein the recognition unit is configured to:
store geographical coordinates of parking space areas located in a field of view of the camera system;
associate a respective occupation status in dependence on the image indications of the parking space areas, said respective occupation status marking whether a respective parking space area is free or occupied; and
provide the respective occupation status of at least the free parking space areas with the associated geographical coordinates to the transmission unit;
wherein the transmission unit is configured to transmit the respective occupation status of at least the free parking space areas with the associated geographical coordinates to the mobile display unit;
wherein the camera system is adapted to set an exposure time in a substantially unlimited time range in dependence on a brightness in the field of view of the camera system; and
wherein a marking is applied to a carrier element of the street-lighting device or another street-lighting device in the field of view of the camera system, and wherein the marking is in an unchangeable position relative to the detected parking space areas to allow compensation for movements of the street-lighting device.

* * * * *